No. 718,629. PATENTED JAN. 20, 1903.
W. S. HUNT.
STEAM COOKER.
APPLICATION FILED MAY 22, 1902.
NO MODEL.
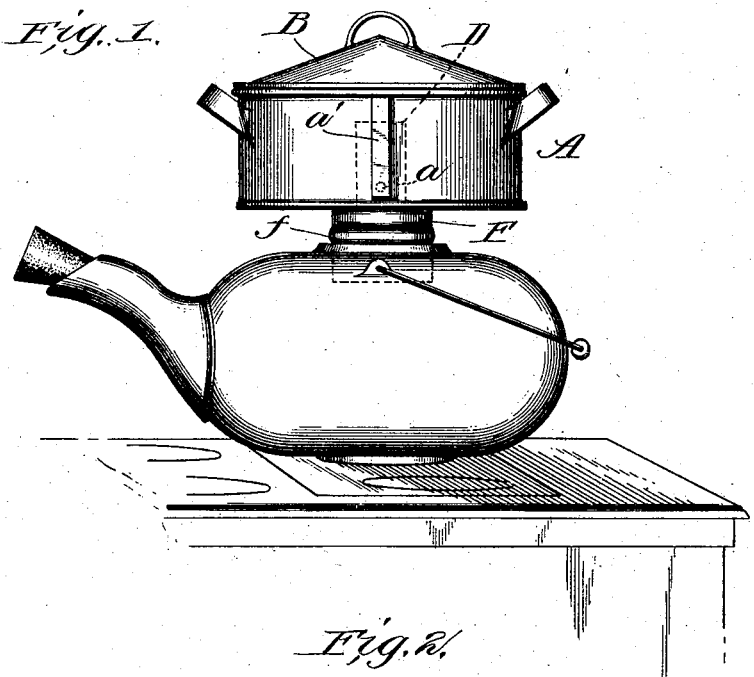
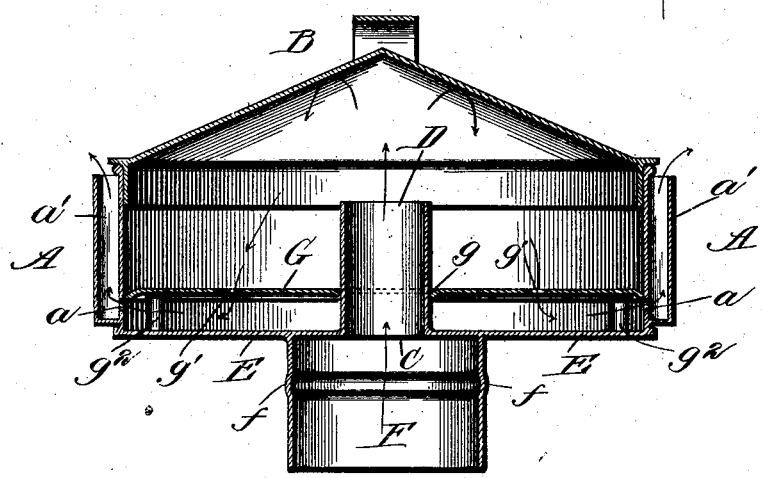
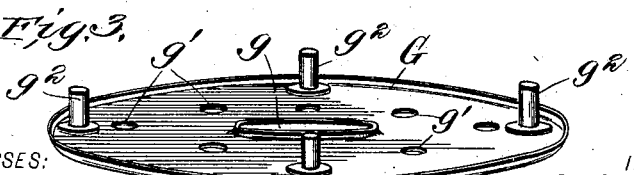
WITNESSES:
Fred. P. Bradford.
Geo. S. Brock.
INVENTOR
William S. Hunt.
BY Munn & Co.
ATTORNEYS.

UNITED STATES PATENT OFFICE.

WILLIAM SELONIOUS HUNT, OF OWOSSO, MICHIGAN.

STEAM-COOKER.

SPECIFICATION forming part of Letters Patent No. 718,629, dated January 20, 1903.

Application filed May 22, 1902. Serial No. 108,491. (No model.)

*To all whom it may concern:*

Be it known that I, WILLIAM SELONIOUS HUNT, of Owosso, in the county of Shiawassee and State of Michigan, have invented a new and useful Improvement in Steam-Cookers, of which the following is a specification.

My invention relates to an improvement in steam-cookers, and has for its object to provide a simple, cheap, and efficient cooker in which food may be quickly and thoroughly cooked and one which may be used in conjunction with an ordinary tea-kettle.

To these ends my invention consists in the particular construction, arrangement, and combination of parts, as will hereinafter be fully set forth, and pointed out in the claims, reference being had to the accompanying drawings, in which—

Figure 1 is a side elevation of my improved steam-cooker applied to an ordinary tea-kettle. Fig. 2 is a central vertical section. Fig. 3 is a bottom perspective view of the false bottom.

A cylindrical or other shaped vessel A is provided with a cover B, which fits the upper edge of the same tightly and is made, preferably, dome-shaped, as shown. The bottom E of the vessel A is centrally perforated, as at C, and extending upwardly from this bottom is a cylindrical tube D, secured to the bottom within the perforation C and rising to a height nearly equal to that of the vessel A. Extending downwardly from the bottom E of the vessel is an annular collar F, which surrounds the perforation C therein. Said annular collar F is provided at a suitable point with an annular horizontal swell or bead $f$, which is adapted to rest upon the mouth of an ordinary tea-kettle, so that the portion of the collar F below the flange or bead fits within the tea-kettle. The tea-kettle may be provided with a cork or any other suitable gasket fitted within its neck, whereby a perfectly steam-tight joint between the tea-kettle and the collar F is insured.

Within the vessel A is a false bottom G, which has a central perforation or opening $g$, adapted to fit over the cylindrical tube D. The false bottom is also provided with a series of smaller perforations $g'$, the purpose of which will presently appear, and the downwardly-projecting legs $g^2$, which rest upon the bottom E of the vessel A and support the false bottom a slight distance above the said bottom E, leaving a space between the real and false bottom.

Near the bottom of the side walls of the vessel A at suitable intervals small perforations $a$ are made and secured to the outside of the side walls. Over these perforations $a$ are secured the small vertical eduction-tubes $a'$, which are closed at the bottom, but open to the atmosphere at the upper end.

In using my cooker the vessel is placed on an ordinary tea-kettle with the swell or bead $f$ resting on the open neck thereof, forming a tight joint, and a cork or other suitable stopper is applied to the upper end of the spout of the tea-kettle, tightly closing the same. The food to be cooked is then placed on the perforated false bottom G or in suitable receptacles when it is desired to cook several different articles at the same time, and the cover B is then tightly fitted to the vessel A. When the steam has been generated in the tea-kettle, it can only pass up through the central cylindrical tube D, and, striking the cover B, will be deflected downwardly and pass through the food on the false bottom or in the receptacles before mentioned, out through the perforations $a$ in the side of the vessel A, and upwardly through the outside vertical eduction-tubes $a'$ to the atmosphere, thus causing a complete circulation through the articles being cooked. When slices of bread or other food are laid upon the false bottom to be cooked, the bottom slices or layers will be as dry as those above, as the water of condensation that may ensue will settle on the bottom E below the false bottom G, which is held away from the said bottom E by the legs $g^2$.

Thus it will be seen that I provide a steam-cooker that can be easily and cheaply made and which is particularly adapted for use with an ordinary tea-kettle.

The vessel A and the cover B will be provided with suitable handles.

Having thus described my invention, what I claim as new, and desire to secure by Letters Patent, is—

1. A steam-cooker consisting of a main receptacle having a centrally-perforated bottom, a downwardly-projecting annular collar surrounding said central perforation, and adapted to fit in the neck of a kettle, an inner central vertical tube projecting upwardly from the bottom of the receptacle and surrounding the central perforation therein, a cover fitting the upper edge of the receptacle, vertical eduction-tubes secured to outer walls of the receptacle, and closed at the lower end and open at the upper end, said lower ends communicating with perforations located a short distance above the bottom of the receptacle.

2. A steam-cooker consisting of a receptacle and a cover therefor, said receptacle provided with a centrally-perforated bottom, a vertical tube projecting upwardly from the bottom and surrounding the central perforation, a false bottom surrounding said vertical tube, and held away from the main bottom by suitable legs, vertical eduction-tubes secured to the outside of the receptacle, said eduction-tubes having an open upper end and closed lower end, the said lower end communicating with perforations located in the side walls of the receptacle near the bottom thereof, and an annular downwardly-projecting collar secured to the bottom of the receptacle, adapted to fit in the neck of a kettle.

3. A steam-cooker comprising a receptacle and cover therefor, said receptacle provided with a centrally-perforated bottom, a vertical tube upwardly extending from said perforation, an annular collar projecting downwardly from the bottom and surrounding said central perforation, said annular collar having a horizontal swell or bead intermediate its ends, said collar being adapted to fit the top of a kettle and rest upon the horizontal swell or bead, vertical steam-eduction tubes secured to the outer surface of the receptacle, said tubes having an open upper end and closed lower end, said tubes communicating with small openings in the side walls of the receptacle near the bottom thereof.

4. A steam-cooker consisting of a receptacle and suitable cover, a centrally-perforated bottom, a central vertical tube projecting upwardly from said central perforation to near the top of the receptacle, and steam-escape openings in the sides of the receptacle near the lower end thereof, a downwardly-projecting annular collar secured to the bottom of said receptacle adapted to fit in the upper end of a kettle, whereby steam generated in the kettle is caused to pass upwardly into the receptacle to be deflected downwardly through the articles to be cooked and to the atmosphere and pass through the perforations in the sides near the lower portion thereof.

WILLIAM SELONIOUS HUNT.

Witnesses:
ISAAC H. KULER,
GILBERT L. TAYLOR.